W. W. ROBINSON.
TIRE DEFLATION SIGNAL.
APPLICATION FILED JULY 31, 1915.
1,235,727.
Patented Aug. 7, 1917.
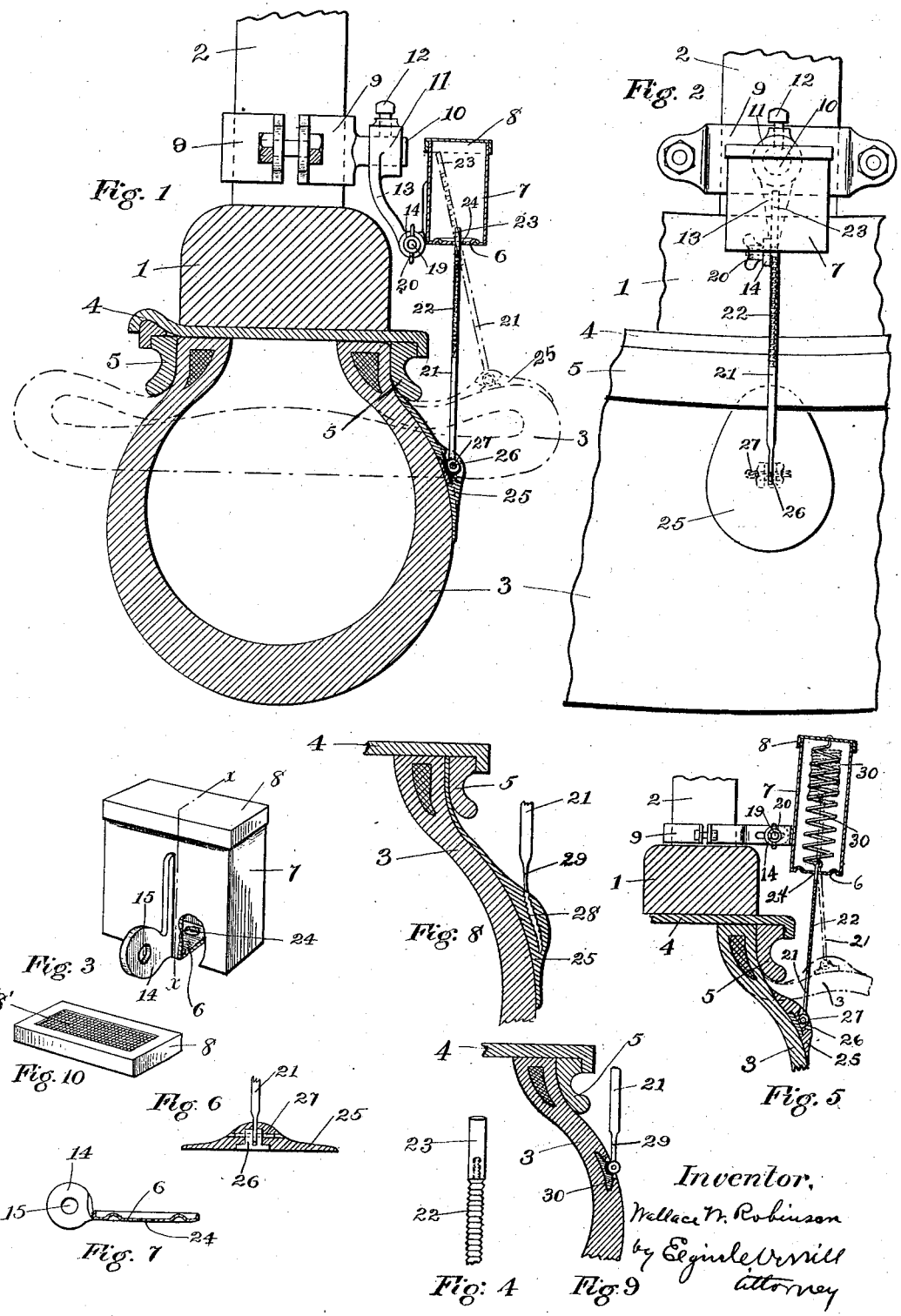
Inventor,
Wallace W. Robinson
by Reginald Orrill
attorney

UNITED STATES PATENT OFFICE.

WALLACE W. ROBINSON, OF PORTLAND, MAINE.

TIRE-DEFLATION SIGNAL.

1,235,727.  Specification of Letters Patent.  Patented Aug. 7, 1917.

Application filed July 31, 1915. Serial No. 42,925.

*To all whom it may concern:*

Be it known that I, WALLACE W. ROBINSON, a citizen of the United States, residing at Portland, in the county of Cumberland and State of Maine, have invented certain new and useful Improvements in Tire-Deflation Signals, of which the following is a specification.

This invention relates to improvements in deflation signals for use in connection with pneumatic tires. Its object is to provide a purely mechanical means for sounding an alarm when the tire is deflated or under-inflated.

The drawings illustrate some preferred embodiments of my invention.

In said drawings Figure 1 is a transverse sectional view showing one form of my alarm; Fig. 2 is a side elevation of the same; Fig. 3 is a detail of one form of the sounder, a part being broken away; Fig. 4 is an enlarged view of the upper end of the actuator; Fig. 5 is a detail sectional view of another form of my invention; Fig. 6 is a detail transverse sectional view showing one method of attaching the actuator to the tire; Fig. 7 is a detail sectional view of another form of the sounder; Fig. 8 is a detail in section showing a different method of attaching the actuator to the tire; Fig. 9 is a detail sectional view of a different method of attaching the actuator, and Fig. 10 is a perspective view of a perforated top of the sounder.

Same reference characters indicate like parts in the several figures.

In said drawings 1 is a felly, 2 a spoke, 3 a shoe or casing, 4 a rim and 5 retaining rings of an automobile wheel which may be of any desired construction, and of themselves form no part of this invention. Secured to some part of the wheel, a spoke for example, is a sounder 6 which may, if desired, be one end of a closed vessel 7 which may be provided with a removable cap 8 which may be perforated as seen at 8'. Any convenient means may be employed for supporting the sounder. As shown it consists of a clamp 9 adapted to engage and be vertically adjustable on the spoke. It has a laterally projecting bar 10 on which is slidably mounted a sleeve 11 adapted to be held in a given place by a set screw 12. The sleeve has a projecting arm 13 terminating in a bearing 19 to which the sounder is pivotally attached by means of an ear 14 provided with a hole 15 to receive the bearing. The sounder may be pivotally mounted and held at any angle by means of a set screw 20. Yieldingly attached to the lateral wall of the tire is an actuator which may be any device adapted to actuate the sounder. In the drawings I have illustrated some forms of the actuator and illustrated its operation. In Fig. 1 the actuator is in the form of a rod 21 having its free end adapted to reciprocate in contact with the sounder, preferably through a hole 24 in the center thereof. In this case the actuator has a rough sound producing section 22 which, when the tire is under inflated, engages the edge of the sounder, and a non-sound-producing section 23 which, when the tire is properly inflated, engages the sounder but does not produce any sound. In Fig. 5 the actuator may be flexible and be held normally out of contact with the sounder by a spring 30, but is adapted, when the tire moves laterally during the process of deflation, to engage the sounder. However, the manner in which the actuator engages the sounder is not limited to the specific form shown but may include any efficient means therefor. The method of attaching the connecting rod to the tire may be varied at will. The form shown in Figs. 1 and 2 consists of a pad 25 secured to the side of tire or formed integral therewith in which is mounted a bearing 26 to which the end of the rod is pivotally attached by means of a pin 27. In Fig. 9 the bearing for the actuator is embedded in the tire itself. In Fig. 8 is a different method of attaching it which consists in corrugating the end of the rod as shown at 28 and embedding it in the pad or tire, which being resilient allows the rod to move laterally relative to the position of the sounder. In this case the rod may have an intermediate flexible section 29.

It is noted that the means of attaching the end of the actuator to the tire, the form of the sounder and the manner in which the actuator actuates the sounder, may vary greatly and still be within the spirit and scope of my invention.

I claim:

1. In a device of the character described, a sounder attached to a wheel and an actuator therefor having one end attached to a tire and the other end adapted to slide in contact with the sounder.

2. In a device of the character described, a sounder attached to a wheel and an actuator therefor having one end yieldingly attached to a tire and the other end adapted to slide in contact with the sounder.

3. In a device of the character described, a sounder attached to a wheel and an actuator therefor having one end pivotally attached to a tire and the other end adapted to slide in contact with the sounder.

4. In a device of the character described, a sounder attached to a wheel and an actuator therefor having one end embedded in a tire and the other end adapted to slide in contact with the sounder.

5. In a device of the character described, a sounder and an actuator therefor consisting of a rod having one end attached to the side of a tire and the other end adapted to reciprocate in contact with the sounder.

6. In a device of the character described, a sounder and an actuator therefor consisting of a rod having one end attached to the side of a tire, said rod having a roughened sound producing section and a non-sound-producing end.

7. In a device of the character described, a sounder comprising a plate having a hole therein and an actuator therefor comprising a rod having one end attached to the side of a tire and the other end projecting through said hole in the sounder.

8. In a device of the character described, a sounder, an actuator therefor comprising a rod having one end attached to the side of a tire and the other end attached to a spring, said rod being adapted to reciprocate in contact with the sounder.

9. In a device of the character described, a sounder attached to a wheel and an actuator therefor comprising a rod having one end attached to a tire, the actuator being adapted to be operated by the lateral movement of the tire.

10. In a device of the character described, a sounder attached to a wheel and an actuator therefor having one end attached to a tire, the attaching means lying outside the inner wall of the tire.

In witness whereof I affix my signature.

WALLACE W. ROBINSON.